United States Patent
Chinya et al.

(10) Patent No.: US 11,907,827 B2
(45) Date of Patent: Feb. 20, 2024

(54) SCHEDULE-AWARE TENSOR DISTRIBUTION MODULE

(71) Applicant: Intel Corporation, Santa Clara, CA (US)

(72) Inventors: Gautham Chinya, Sunnyvale, CA (US); Huichu Liu, Santa Clara, CA (US); Arnab Raha, Santa Clara, CA (US); Debabrata Mohapatra, Santa Clara, CA (US); Cormac Brick, San Francisco, CA (US); Lance Hacking, Spanish Fork, UT (US)

(73) Assignee: Intel Corporation, Santa Clara, CA (US)

( * ) Notice: Subject to any disclaimer, the term of this patent is extended or adjusted under 35 U.S.C. 154(b) by 1272 days.

(21) Appl. No.: 16/456,707

(22) Filed: Jun. 28, 2019

(65) Prior Publication Data

US 2020/0410327 A1 Dec. 31, 2020

(51) Int. Cl.

| G06N 3/063 | (2023.01) |
| G06N 5/04 | (2023.01) |
| G06F 9/448 | (2018.01) |
| G06F 9/38 | (2018.01) |
| G06F 9/50 | (2006.01) |

(52) U.S. Cl.
CPC ........... *G06N 3/063* (2013.01); *G06F 9/3814* (2013.01); *G06F 9/3877* (2013.01); *G06F 9/4498* (2018.02); *G06F 9/5027* (2013.01); *G06N 5/04* (2013.01)

(58) Field of Classification Search
CPC ............ G06N 3/063; G06N 3/06; G06N 3/04; G06N 3/08; G06N 5/04; G06F 9/4498; G06F 9/3814; G06F 9/3877; G06F 9/5027

See application file for complete search history.

(56) References Cited

U.S. PATENT DOCUMENTS

| 2017/0344882 A1 | 11/2017 | Ambrose et al. |
| 2018/0314671 A1* | 11/2018 | Zhang .................... G06N 3/063 |
| 2019/0324748 A1* | 10/2019 | Fowers ................. G06F 9/3001 |

(Continued)

OTHER PUBLICATIONS

F. Tu, S. Yin, P. Ouyang, S. Tang, L. Liu and S. Wei, "Deep Convolutional Neural Network Architecture With Reconfigurable Computation Patterns," in IEEE Transactions on Very Large Scale Integration (VLSI) Systems, vol. 25, No. 8, pp. 2220-2233, Aug. 2017 (Year: 2017).*

(Continued)

*Primary Examiner* — Kamran Afshar
*Assistant Examiner* — Brian J Hales
(74) *Attorney, Agent, or Firm* — Akona IP PC

(57) ABSTRACT

Methods and systems include a neural network system that includes a neural network accelerator. The neural network accelerator includes multiple processing engines coupled together to perform arithmetic operations in support of an inference performed using the deep neural network system. The neural network accelerator also includes a schedule-aware tensor data distribution circuitry or software that is configured to load tensor data into the multiple processing engines in a load phase, extract output data from the multiple processing engines in an extraction phase, reorganize the extracted output data, and store the reorganized extracted output data to memory.

18 Claims, 14 Drawing Sheets

(56) References Cited

U.S. PATENT DOCUMENTS

2019/0392287 A1* 12/2019 Ovsiannikov ............ G06N 3/08
2020/0057561 A1* 2/2020 Lai ........................ G06N 3/063

OTHER PUBLICATIONS

Wenyan Lu et al., "FlexFlow: A Flexible Dataflow Accelerator Architecture for Convolutional Neural Networks", 2017 IEEE International Symposium on High Performance Computer Architecture (HPCA), IEEE, pp. 553-564, XP033094170, Feb. 4, 2017.
Fengbin Tu et al., "Deep Convolutional Neural Network Architecture With Reconfigurable Computation Patterns", IEEE Transactions on Very Large Scale Integration (VLSI) Systems, IEEE Service Center, Piscataway, NJ, USA, vol. 25, No. 8, pp. 2220-2233, XP011657708, Aug. 1, 2017.
Arash Azizimazreah et al., "Flexible On-chip Memory Architecture for DCNN Accelerators", First International Workshop on Architectures for Intelligent Machines (AIM 2017), Portland, Oregon, USA, pp. 1-6, XP055544224, Sep. 10, 2017.
Jiajun Li et al., "SmartShuttle: Optimizing off-chip memory accesses for deep learning accelerators", 2018 Design, Automation & Test in Europe Conference & Exhibition (DATE), EDAA, pp. 343-348, XP033333924, Mar. 19, 2018.
Weiwei Wu et al., "MoNA: Mobile Neural Architecture with Reconfigurable Parallel Dimensions", 2019 17th IEEE International New Circuits and Systems Conference (NEWCAS), IEEE, pp. 1-4, XP033692528, Jun. 23, 2019.
Extended European Search Report for EP20165373 dated Sep. 18, 2020, 15 pages.

* cited by examiner

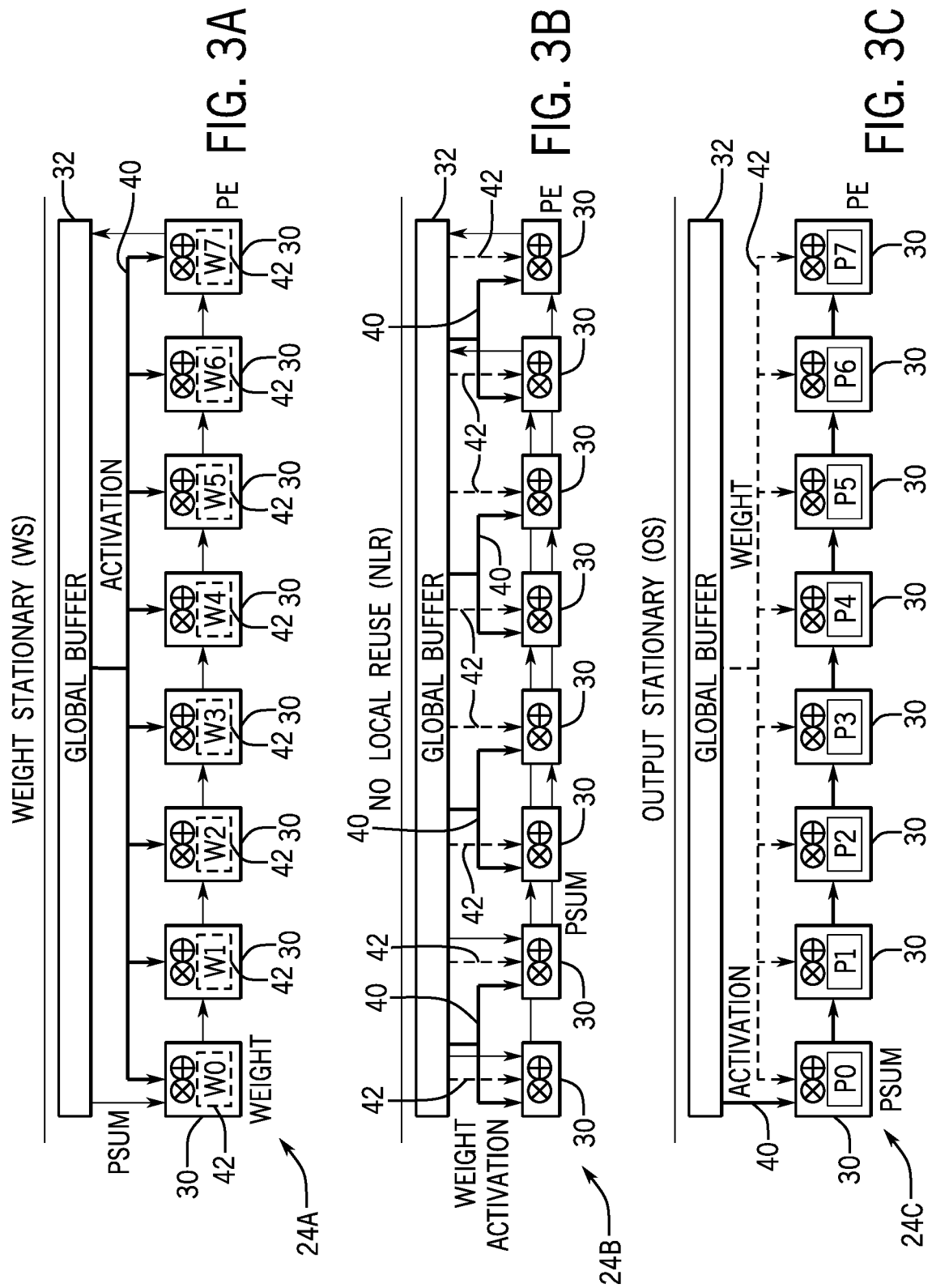

SCHEDULE-AWARE TENSOR DISTRIBUTION MODULE

BACKGROUND

This disclosure relates to a schedule-aware tensor distribution in a neural network, such as a deep neural network (DNN).

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

DNNs are currently used in numerous artificial intelligence (AI)/machine learning (ML) applications. For instance, DNNs may be applied to computer vision applications, speech recognition applications, robotics applications, and the like. While DNNs deliver state-of-the-art accuracy on many AI/ML tasks, it comes at the cost of high computational complexity. Furthermore, DNNs include multiple layers that may each have different optimal schedules (e.g., loop order, loop blocking and partition for tensor processing). Mismatches between adjacent layers may cause significant bank conflicts during a loading phase of processing elements (PEs). These bank conflicts cause performance and energy penalties due to more random-access memory (RAM) reads used to complete the work.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Methods and systems include a deep neural network system that includes a neural network accelerator comprising. The neural network accelerator includes multiple processing engines coupled together to perform arithmetic operations in support of an inference performed using the deep neural network system. The neural network accelerator also includes a schedule-aware tensor data distribution module that: loads tensor data into the multiple processing engines in a load phase, extracts output data from the multiple processing engines in an extraction phase, reorganizes the extracted output data, and stores the reorganized extracted output data to memory.

Various refinements of the features noted above may be made in relation to various aspects of the present disclosure. Further features may also be incorporated in these various aspects as well. These refinements and additional features may be made individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIGS. 3A-3D are a block diagrams of example accelerators of FIG. 1 with associated fixed schedules, in accordance with an embodiment;

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

Machine learning accelerators handle large amounts of tensor data for performing inference tasks. Processing this data involves data movement across multiple levels of memory hierarchy. Reducing data transfer and maximizing data reuse and resource utilization may be used to improve energy efficiency. However, traditional accelerators for deep neural networks (DNN) support a custom memory hierarchy and a fixed manner in which the tensors for activations and weights are moved into the processing units to perform tensor operations for each layer of the network. The movement of data across the memory hierarchy and the degree of reuse dictates the energy consumed for each layer.

Some DNNs may use analytical models to attempt to increase energy efficiency by maximizing reuse from the innermost memory hierarchy. Given that most of DNNs have 10s to 100s of layers with many of the layers having different preferences for schedules, these fixed-schedule DNN accelerators can only provide optimal data reuse and resource utilization for a few of the DNN layers. This limited reuse and utilization limits the overall energy efficiency of the DNN accelerator. These DNN accelerators also have strong network dependency which can be challenging for adapting with the fast evolving DNNs.

Instead, a flexible schedule-aware tensor data distribution module (FSAD) that enables flexible scheduling and dataflow without greatly increasing overhead and/or costs. This FSAD empowers the DNN inference engine to 1) minimize static random-access memory (SRAM) bank conflicts when transferring tensor data from/to a processing engine (PE), 2) enable flexible schedules and dataflow in hardware for data reuse in convolution layers, and/or 3) exploit enhanced energy efficiency in all convolution layers for edge inference tasks. The FSAD may be implemented in hardware circuitry, software, or a combination thereof. For example, the FSAD may be implemented by storing instructions in memory that are configured to cause the accelerator to reorganize data extracted from one layer before loading the data into a next layer.

Figure 1:
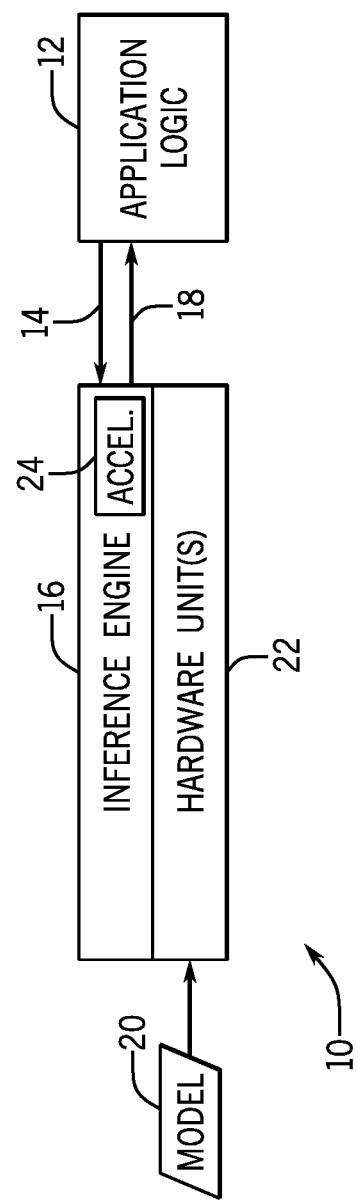
FIG. 1 is a block diagram of a deep neural network (DNN) system having an accelerator, in accordance with an embodiment.

FIG. 1 is a block diagram of DNN system 10. The DNN system 10 provides DNN functionality to one or more application logic(s) 12. The application logic 12 may include application software and/or hardware components used to perform specification functions (e.g., image processing applications). The application logic 12 forwards data 14 to an inference engine 16. The inference engine 16 is a runtime element that delivers a unified application programming interface (API) that integrates a DNN inference with the application logic 12 to provide a result 18 to the application logic 12.

To provide the DNN inference, the inference engine 16 uses a model 20 that controls how the DNN inference is made on the data 14 to generate the result 18. Specifically, the model 20 includes a topology of layers of the DNN. The topology includes an input layer that receives the data 14, an output layer that outputs the result 18, and one or more hidden layers between the input and output layers that provide processing between the data 14 and the result 18. The topology may be stored in an extensible markup language (XML) file. The model 20 may also include weights and/or biases for results for any of the layers while processing the data 14 in the inference using the DNN.

The inference engine 16 may be implemented using and/or connected to hardware unit(s) 22. The hardware unit(s) 22 may include processors and/or programmable logic devices. For instance, the processors may include central processing units (CPUs), graphics processing units (GPUs), vision processing units, and the like. The programmable logic devices may include logic arrays, complex programmable logic devices, field-programmable gate arrays, and the like.

Figure 2:
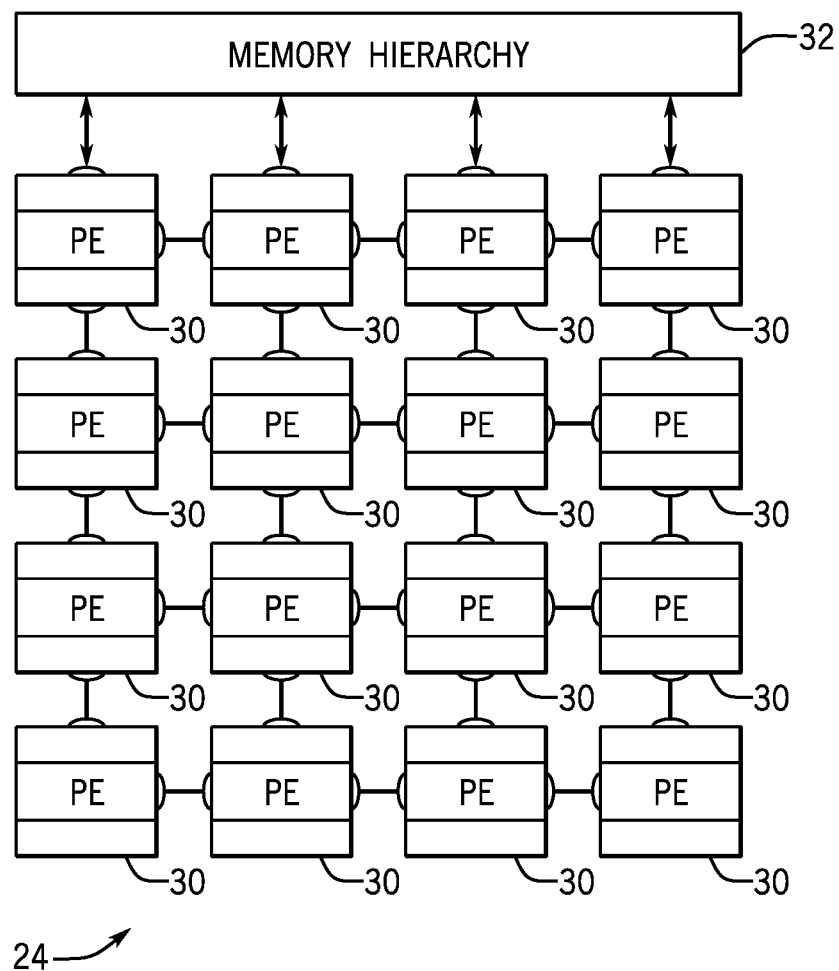
FIG. 2 is a block diagram of the accelerator of FIG. 1, in accordance with an embodiment.
Figure 3D:
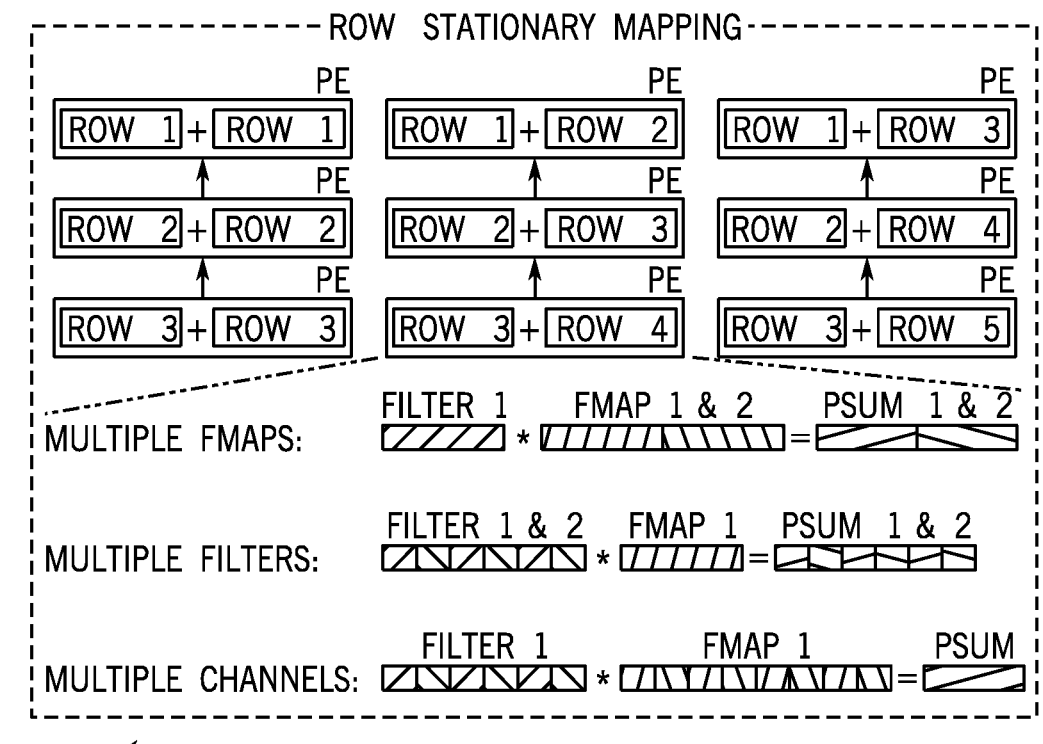

Furthermore, the inference engine 16 may include one or more accelerator(s) 24 that provide hardware acceleration for the DNN inference using one or more of the hardware units 22. FIG. 2 is an example embodiment of an accelerator 24 that may be used with the DNN system 10. As illustrated, the accelerator 24 includes a spatial array of processing elements (PEs) 30 and local memory 32 that may include register files and/or SRAM banks. For inference tasks, the weights or filters may be pre-trained and layer-specific and are loaded to the array of PEs 30 from the local memory 32 (e.g. dynamic random-access memory (DRAM) and SRAM buffers). Input data, known as input activations or feature maps, are also brought in to arrays of PEs 30. Inside the PEs 30, multiply accumulate (MAC) operations are performed in respective MAC operators through multiple input channels (ICs) and generate output activations. Multiple sets of weight tensors (OC) may be used against a given set of activations to produce an output tensor volume. A non-linear function (e.g. rectified linear function) may be applied to the output activations that, in turn, become input activations for a next layer.

As previously discussed, designs of Accelerators 24 may implement fixed schedules with fixed dataflow. For example, FIGS. 3A-3D illustrates example DNN accelerators with their supported schedules. For example, the accelerator 24A (e.g., NeuFlow and ISAAC) in FIG. 3A may implement a weight stationary schedule that uses a single parallel transmission of an activation 40 and minimizes weight 42 read energy consumption by maximizing convolutional flow and filtering reuse of weights. The accelerator 24B (e.g., DianNao, DaDianNao, TPU, Zhang-UCLA, and Google TPU) in FIG. 3B may implement a Non-Local Reuse scheme that uses a large global buffer as shared storage to reduce DRAM access energy consumption. The accelerator 24C (e.g., ShiDianNao and Movidius VPU2 with sparsity) in FIG. 3C may implement an output stationary schedule that minimizes partial sum read/write energy consumption by maximizing local accumulation. The accelerator 24D (e.g., Eyeriss) in FIG. 3D implements a row stationary schedule.

One of the main challenges to these accelerators 24 is due to their tensor data distribution module hardware that only performs addressing on-die storage, transferring tensor data to processing engine (PE) arrays, and storing data back to the SRAM banks. Their tensor data distribution modules are unaware of any schedule information. Therefore, these accumulators may not implement different schedules (i.e. dataflows). Instead of a schedule-agnostic flow via conventional tensor data distribution modules, a FSAD that uses the schedule information to argument the tensor data shape enables flexible schedules in DNN accelerators.

Besides hardware solutions, software-based solutions may be used to transfer and reshape the tensor data in general purpose CPUs and GPUs. However, fixed-function accelerators do not support such flexibility in the design. Therefore, even such software solutions may not be used in existing accelerators. Instead, the FSAD prepares the tensor data based on the optimal schedules on a per-layer basis. The FSAD also enables software to configure an optimal method to handle the tensor operation based on the dimensions of the tensors involved in the operation. Furthermore, the FSAD enables switching among multiple schedules and enables re-arranging the data based on the schedule so that a number of accesses to the local memory 32 is reduced in accomplishing the given tensor operation. Additionally, although FPGAs may also be used for DNN acceleration in the accelerator 24 to provide flexibility, the hardware configuration of the FPGA cannot be changed during execution of one DNN application thereby ensuring that a fixed schedule and one type of dataflow during execution of the inference.

Since the tensor volumes and the number of layers in DNNs may be large for high classification accuracy (e.g. ResNET50, YOLO, and the like) and since data movement is generally more energy expensive than computation, reducing data movement and maximizing data re-use are key in an energy-efficient DNN accelerator design. This key is even more important for inference engines 16 in the devices. Depending on the dataflow (how the data such as input activations, weights and partial sums are distributed to each PE and re-used), inference engines 16 (and their accelerators 24) are categorized into input stationary, weight stationary, output stationary, and row stationary, as previously discussed. The data reuse scheme depends on the loop order, loop blocking and partition for tensor processing. The "schedule" as used herein refers to these elements together. In fixed-schedule inference engines 16 having the loop order, blocking, and partition in convolution operations fixed, an accelerator 24 can only implement one type of dataflow with one scheme of data.

However, given the divergences of the tensor dimensions across layers in DNN, fixed-schedule inference engines 16 may only provide optimal energy efficiency for a subset of layers, but not all of them. For example, a first layer may prefer input stationary, a second layer may prefer weight stationary, but a third layer may prefer partial sum stationary. With an optimal schedule for every layer, the SRAM access reduction results in energy improvements. For example, the FSAD may provide up to a 41% improvement in energy efficiency compared to Eyeriss and up to 26% improvement over TPU, assuming optimal schedule for every layer. Depending on the hardware resources and the cost of memory access, optimal schedules can be very different from layer-to-layer and/or network-to-network.

Supporting flexible schedules may exploit an increased energy efficiency that is layer-specific due to the dimensions of the tensor involved in performing the tensor operation. However, different schedules use input activations/input feature maps (IF) and weights/filters (FL) arranged in the SRAM in a manner that is aware of the subsequent access pattern for the next layer that will use the activation. In the inference task, since the FL is pre-trained, the inference task may be arranged based on the known schedule preference for each layer. However, the IF is generated as output activations/output feature maps (OF) at run time except for the 1st layer. Therefore, a FSAD re-arranges the output of layer N from the PE array into SRAMs in a way that can be more easily loaded to the PE arrays for the layer N+1 with its preferred schedule. The proposed tensor data distribution module, as discussed below, provides a practical solution to the problem with low hardware overhead.

Thus, the FSAD may be configured to distribute the IF and FL tensor data to PE 30 arrays based on the current layer N's optimal schedule with no bank conflicts. The FSAD may also re-arrange the OF tensor data of the DNN layer N according to the layer N+1's optimal schedule before writing the activations to the SRAM banks.

Figure 4:
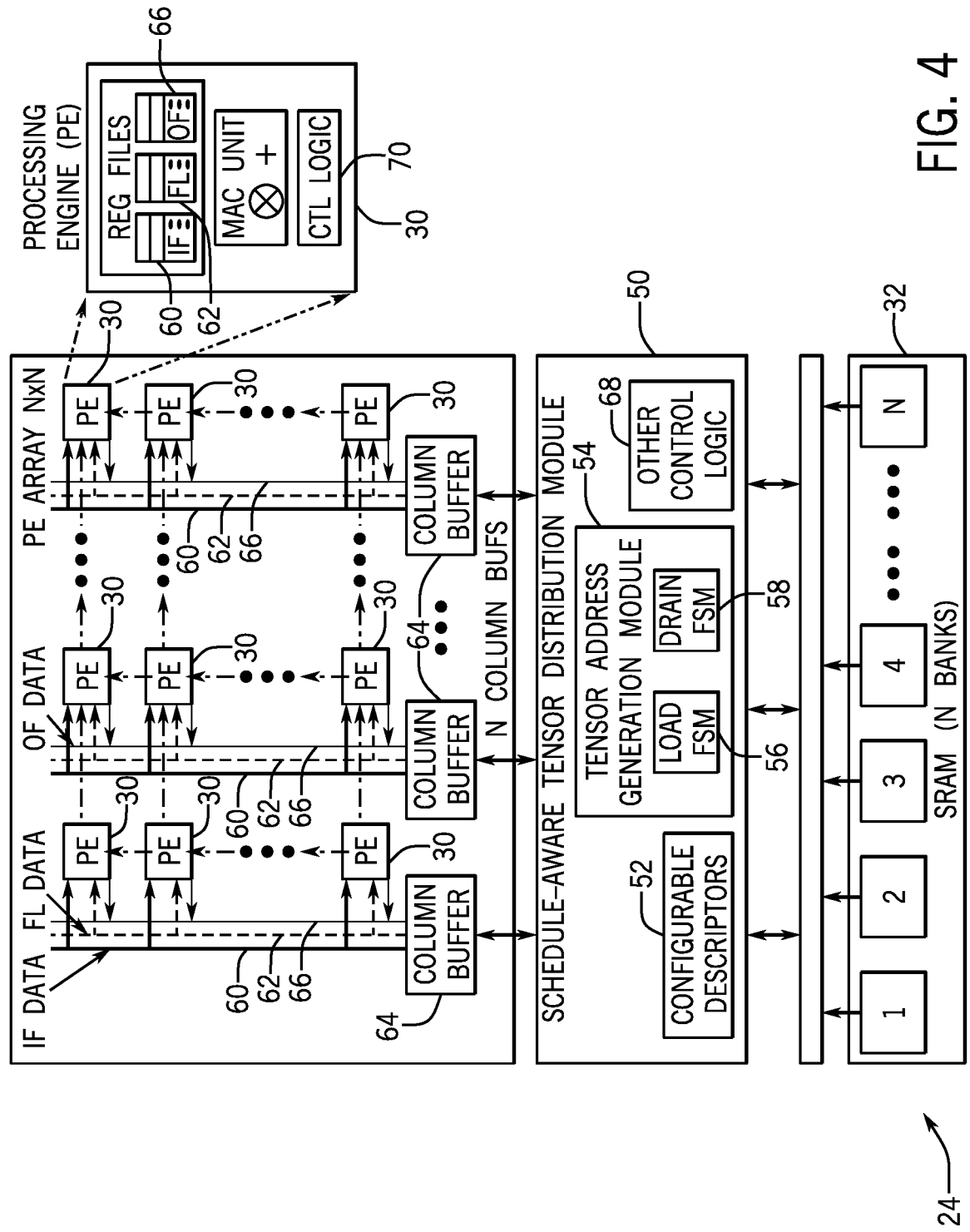
FIG. 4 is a block diagram of the accelerator of FIG. 1 with a flexible schedule-aware tensor data distribution module (FSAD) having a load finite state machine (Load FSM) and a drain finite state machine (Drain FSM), in accordance with an embodiment.

FIG. 4 is a block diagram of the accelerator 24 with an FSAD 50. The FSAD 50 includes configurable descriptor registers 52 storing configurable descriptors that control the dataflow based on a schedule specification for the inference. The FSAD 50 also includes a tensor address generation unit 54. The tensor address generation unit 54 includes a load finite state machine (Load FSM) 56 and a drain finite state machine (Drain FSM) 58. The Load FSM 56 transfers tensor IF tensor data 60 and FL tensor data 62 to the PE 30 array during a load phase of the accelerator 24 using a column buffer 64. The Drain FSM 58 extracts OF tensor data 66 from the PE 30 array during an extraction phase of the accelerator 24 using the column buffer 64. The loading and extraction of the PE 30 is based on the descriptor fields. The FSAD 50 also may include other control logic 68 to interface between PE 30 array (e.g., via control logic 70) and the local memory 32 (e.g., SRAM banks).

Table 1 below shows a non-extensive list of possible descriptor fields to support flexible schedules by controlling direction and reorganization of the tensor data.

TABLE 1

Example descriptor fields.

| Descriptor Fields | Descriptions |
| --- | --- |
| IFActvSRAM | Active input activation (IF) SRAM banks |
| FLActvSRAM | Active weight (FL) SRAM banks |
| StAddrIFSRAM | IF SRAM start address for current layer |
| LinesInnerBlkIFSRAM | Number of IF SRAM lines used in per Inner loop |
| LinesTotalIFSRAM | Number of IF SRAM lines used for 1 convolution layer |
| StrideIFSRAM | IF SRAM line increment step |
| StAddrFLSRAM | FL SRAM start address for current layer |
| LinesInnerBlkFLSRAM | Number of FL SRAM lines used in per Inner loop |
| LinesTotalFLSRAM | Number of FL SRAM lines used for 1 convolution layer |
| StrideFLSRAM | FL SRAM line increment step |
| StAddrOFSRAM | OF SRAM start address for current layer |
| DuplicateIF | IF SRAM line reuse |
| DuplicateFL | FL SRAM line reuse |
| DuplIterIF | Number of times for IF SRAM line reuse |
| DuplIterFL | Number of times for FLSRAM line reuse |
| SRAMLineMuxIF[N] | Load path dataflow control, IF SRAM line select signal for each column of PE |
| SRAMByteMuxIF[N] | Load path dataflow control, IF SRAM byte select signal for each PE in 1 column |
| SRAMLineMuxFL[N] | Load path dataflow control, FL SRAM line select signal for each column of PE |
| SRAMByteMuxFL[N] | Load path dataflow control, FL SRAM byte select signal for each PE in 1 column |
| SRAMBankMuxOF[N] | Drain path dataflow control, OF SRAM buffer bank select signal for PE data in 1 column or in 1 row (depending on OFRowSel) |
| SRAMByteMuxOF[N] | Drain path dataflow control, OF SRAM buffer byte select signal for PE data in 1 column or in 1 row (depending on OFRowSel) |

TABLE 1-continued

Example descriptor fields.

| Descriptor Fields | Descriptions |
| --- | --- |
| SRAMBufByteMask | SRAM buffer byte masks for valid OF data in 1 entry |
| OFColRowSel | Drain path control, column-wise data select (select OF data for PEs in a column as a data block) or row-wise data select (select OF data for PEs in a row as a data block) |
| ByteDuplicateOF | OF data can be written to 1 SRAM buffer entry multiple times |
| ByteDuplIterOF | Number of times for OF data written to 1 SRAM buffer entry |
| ByteOffsetDuplIterOF | Byte offset for OF data writing to 1 SRAM buffer entry |
| LineDuplicateOF | OF data can be written to multiple SRAM buffer entries |
| LineDuplIterOF | Number of times for OF data written to multiple SRAM buffer entries |

At the beginning of each layer, the configuration descriptor registers 52 are updated. The updates include a set of configuration descriptor fields programmed based on the optimal schedule of the current layer (N) for IF and FL dataflows. These schedules are to be used by Load FSM 56 during load phase. Another set of configuration descriptor fields are programmed based on the optimal schedule of the next layer (N+1) for OF or intermediate partial sums (Psum) re-arrangement. These schedules are used by the Drain FSM 58 during drain phase.

Figure 5:
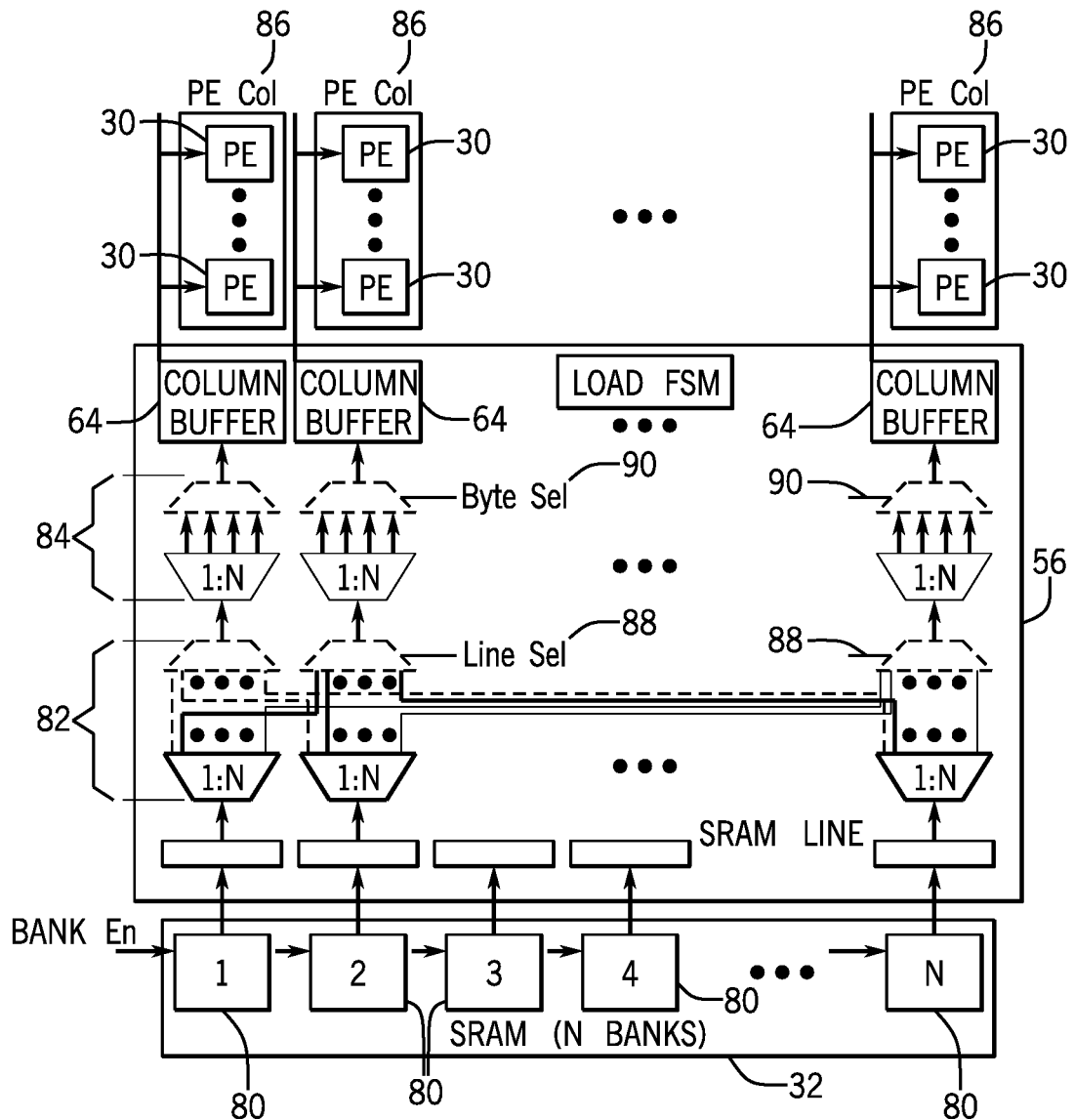
FIG. 5 is a block diagram of the Load FSM of FIG. 4, in accordance with an embodiment.

FIG. 5 illustrates a schematic diagram of the Load FSM 56 used to load tensor data into the PE 30 array. As illustrated, the PE 30 array may include N columns×N rows with the local memory 32 including N SRAM banks 80. The Load FSM 56 includes a first set 82 of multiplexer pairs and a second set 84 of multiplexer pairs that are used to select and distribute the IF and FL tensor data. Each multiplexer pair in the first set 82 of the multiplexer pairs includes a 1:N multiplexer in a load path for each SRAM bank to select IF/FL data to a particular PE column 86. The selection of the IF/FL data is based at least in part on a Line Sel signal 88 programed by a configuration descriptor (e.g., "SRAMLineMuxIF" field for IF and "SRAMLine MuxFL" field for FL). In each of the multiplexer pairs of the second set 84 of the multiplexer pairs, a 1:N multiplexer is used to select each point of the IF/FL data in the same PE column. The selection of the point/byte of the IF/FL data is based at least in part on a Byte Sel signal 90 programed by a configuration descriptor (e.g., "SRAMByteMuxIF" field for IF and "SRAMLineMuxFL" for FL, respectively) with the IF/FL point being selected by one PE 30 in the corresponding PE column 86. Although the illustrated accelerator 24 uses column-based extraction for the PE columns 86, in some embodiments, the accelerators 24 may utilize row-based extraction for PE rows with row buffers using techniques similar to those discussed herein. Furthermore, in some embodiments, the inference engine 16 may utilize a combination of row and column-wise extractions in each accelerator 24 or different extraction types for different accelerators 24 within the inference engine 16.

Figure 6:
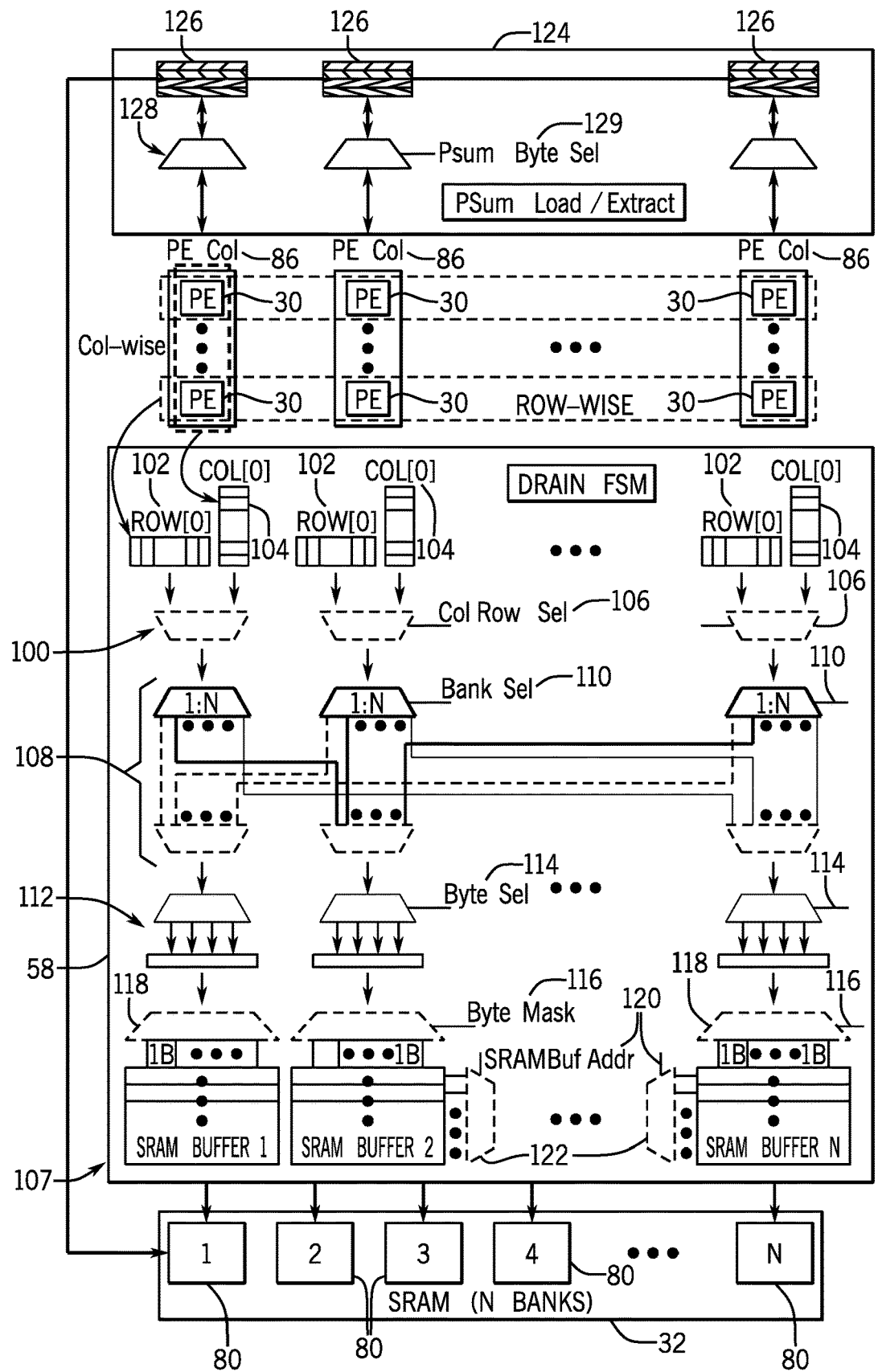
FIG. 6 is a block diagram of the Drain FSM of FIG. 4, in accordance with an embodiment.

FIG. 6 illustrates a schematic diagram of the Drain FSM 58 used to distribute the OF tensor data. In a first set 100 of multiplexers in the drain path, there is one 1:2 multiplexer for each PE column 86 to select an output of a PE 30 in one of two ways: selecting a row 102 in a row-wise output or a column 104 in a column-wise manner. A column/row select signal 106 is controlled by the descriptors which contain the schedule information for layer N+1. In a second set 108 of multiplexers in the drain path, there is one 1:N multiplexer for each SRAM buffer 107 to select OF data to be saved to a particular SRAM Bank 80, based on a Bank Sel signal 110 programed by a corresponding configuration descriptor (e.g., "SRAMBankMuxOF" field). A third set 112 of multiplexers in the drain path, there is one 1:N multiplexer for each point of the OF data in the same SRAM buffer 107 entry. Selection using the third set 112 of multiplexers is performed using a Byte Sel signal 114 programed by a configuration descriptor (e.g., "SRAMByteMuxOF" field). The OF point is selected by the byte position in the SRAM buffer entry based on the Byte Sel signal 114. A byte mask 116 may be programed by configuration descriptors (e.g., "SRAMBufByteMask" field) is applied for masking the invalid bytes in the SRAM buffer entry using multiplexers 118. The array of SRAM buffers 107 may include multiple entries that use register files to stage the OF and form an SRAM line before writing to N SRAM Banks. The SRAM buffer 107 write is byte enabled. Descriptor fields (such as "ByteDuplIter0F", "ByteOffsetDuplIter0F" and "LineDuplIterOF") are used to select which byte or which few bytes to write every cycle by controlling a SRAMBufAddress signal 120 of multiplexers 122. Based on the descriptors, the Drain FSM 58 can write all bytes in one SRAM buffer entry then move on to the next entry or write to a same byte location at different entries every cycle. The write byte location in the SRAM buffer is also flexible to meet different data patterns in the next layer. After composing one SRAM line, each SRAM buffer 107 writes to one corresponding SRAM Bank 80. Using the SRAM buffer 107, the data extracted from the PEs 30 may be reorganized for storage in the SRAM banks 80 according to a specification (e.g., configurable descriptors 52) of the next layer of the inference. Furthermore, since the data may be extracted from the PEs 30 in a column-wise or row-wise organization and may be stored in the SRAM banks 80 using a column-wise or row-wise organization, the schedule-aware tensor distribution module 50 may be used to extract data in a row-wise manner or a column-wise manner and reorganize the data into either a row-wise or column-wise organization in the SRAM banks 80 based on the specification of the next layer.

A Psum distribution module 124 may be used to load/extract partial sums (Psums) using buffers 126 for schedules that use Psum extraction and reload before OF extraction. The Psum distribution module 124 splits 1 Psum points (e.g. 32 bits for 8 bit integer IF/FL/OF precision) into 4 points and directly writes the Psum points into the corresponding SRAM bank 80 of a PE column 86. Each Psum point is the spilt to 4 lines in the SRAM Bank 80. This path may bypass the load and drain data path to reduce Psum load/extract latency. A fourth row of multiplexers 128 is used to select the byte from the PE column 86 based at least in part on a Psum Byte Sel 129 that may be based at least in part on configuration descriptors.

Figure 7:
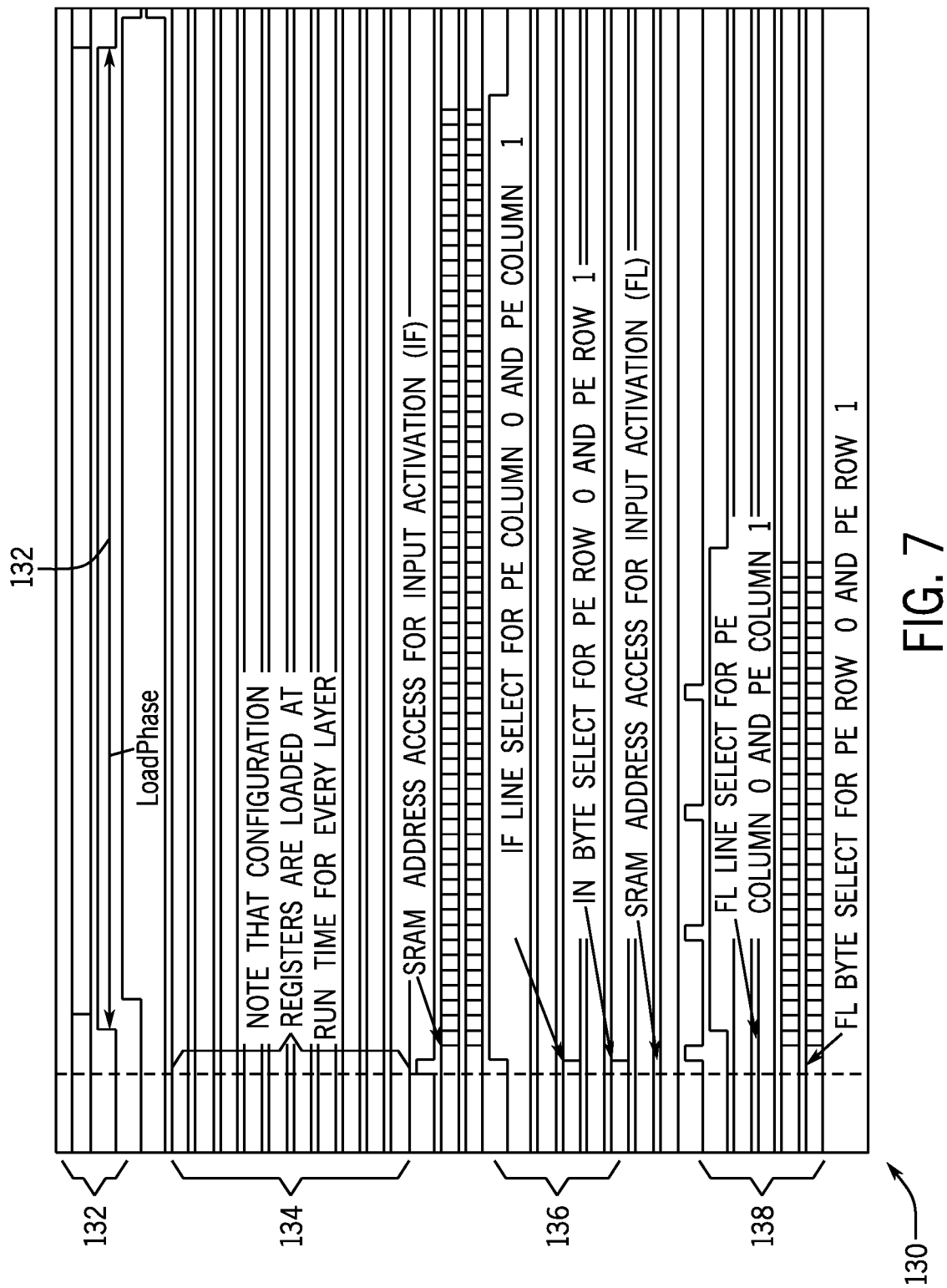
FIG. 7 is a simulation waveform for the Load FSM of FIG. 5, in accordance with an embodiment.
Figure 8:
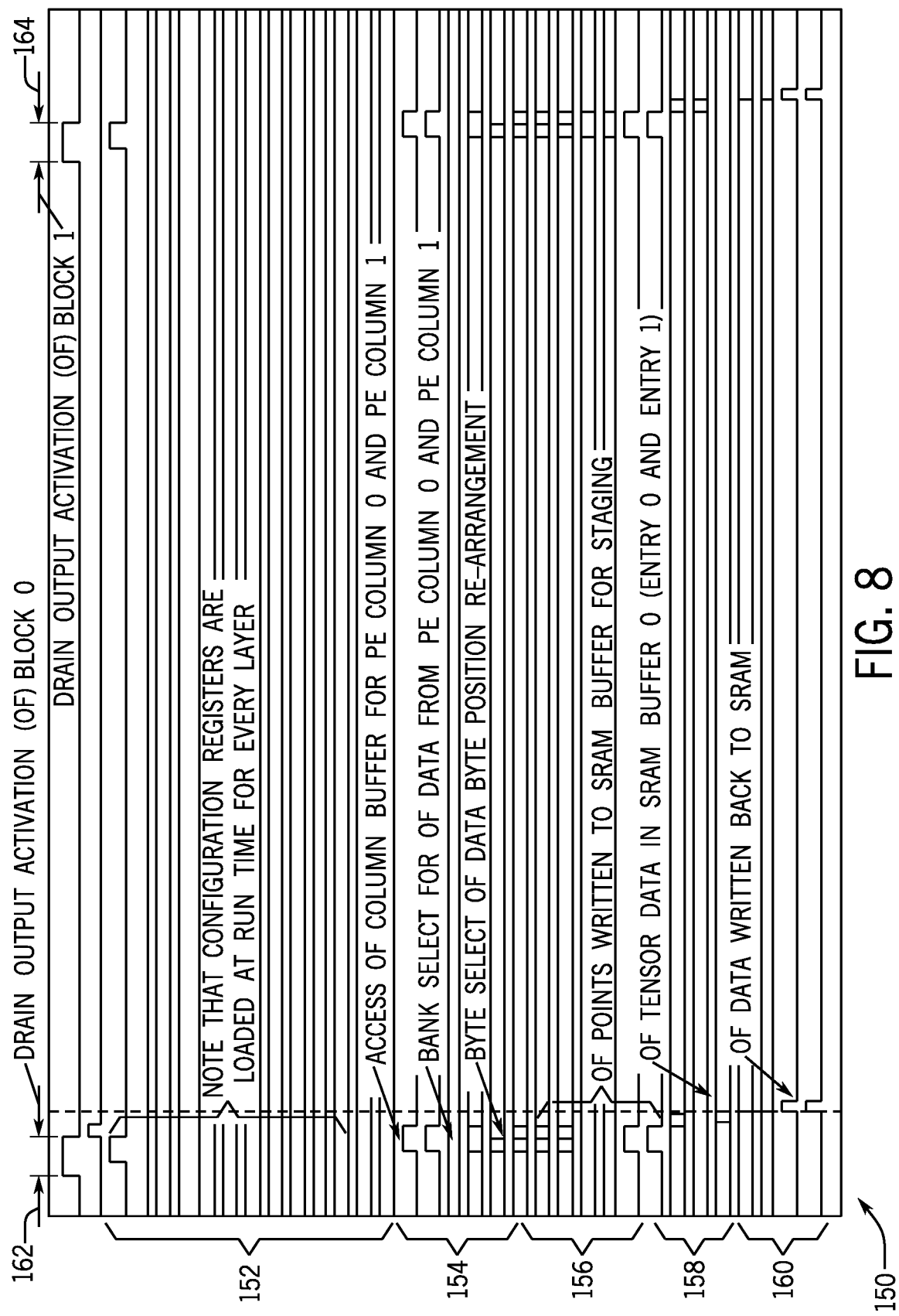
FIG. 8 is a simulation waveform for the Drain FSM of FIG. 6, in accordance with an embodiment.

FIGS. 7 and 8 relate to resolving schedule mismatches between layers. FIG. 7 illustrates a simulation waveform 130 for the Load FSM 56 operation along with control signals. When processing a convolution layer, IF and FL tensor data volume may be large and may not fit into the memory capacity of a single PE 30 during a loading phase 132. Accordingly, the written data may be partitioned and distributed to a 2-dimentional PE 30 array to take advantage of the data parallelism. How much "work" each PE 30 takes (e.g. how many IF and FL) and in which order the compute happens (e.g. first loop all the X and Y directions and generate 1 output channel (OC) partial sum or first loop all input channels (IC) for 1 OX and 1 OY index to generate 1 OF point) are controlled by the schedule. Different schedules have different data mapping and different "work distribution" to the PE arrays. In order to implement different schedules in one DNN accelerator, at the beginning of the convolution layer, the configuration descriptors 134 will be updated from compiler input. Since the data flow is controlled by the descriptor fields, certain numbers of IF and FL data following certain loop blocking and ordering according to the "schedule" of the current layer (N) will be loaded to the column buffers. The N "line select" signals and N "byte select" signals in the load FSM can support different data arbitrations for IF and FL, respectively as illustrated in the IF signals 136 and the FL signals 138. For example, different PE column buffers can access IF or FL data from 1 SRAM Bank (multicast and data reuse) or up to N SRAM Banks (N*N IF points). In 1 column buffer, the connections between column buffer's data to PEs in one column are dedicated since data arbitration is done by FSAD.

FIG. 8 illustrates a simulation waveform 150 for the Drain FSM 58 operation along with control signals. After a compute phase, the generated OF data in each PE 30 is to be extracted based on the next layer (N+1)'s preferred data access patterns laid out in memory to prevent SRAM bank conflicts. As previously discussed, the OF points generated from N×N PE 30 array can be extracted in 2 ways: row-wise or column-wise. The OF data in 1 column or in 1 row can be arbitrated to different SRAM banks using N 1:N multiplexers, determined by N Bank Sel signals 110. A number of Bank Sel signals 110 equals to the PE array column/row dimension (N). Then, these OF points of one SRAM bank is forked to N points and selected by N Byte Sel signals 114 through another N 1:N multiplexers that direct data to selected byte positions in SRAM buffer 107 data entry. One of the configuration descriptors 152 further selects valid byte position in SRAM buffer 107 entry for OF data. After these 3 levels' of multiplexers, the OF points in one PE column 86 or one PE row are re-arranged to form a new data entry of one SRAM buffer 107. The Byte Sel signals 114 and column/row select signals 106 are illustrated in the generated signals 154. OF data writing signals 156 are used to start writing to the SRAM buffer 107. OF data signals 158 are used to write OF data in one SRAM buffer 107 during a drain OF for Block 0 162 during which OF data is written 160 to the SRAM buffer 107. A next SRAM buffer 107 is written in a next OF Block 164.

Figure 9:
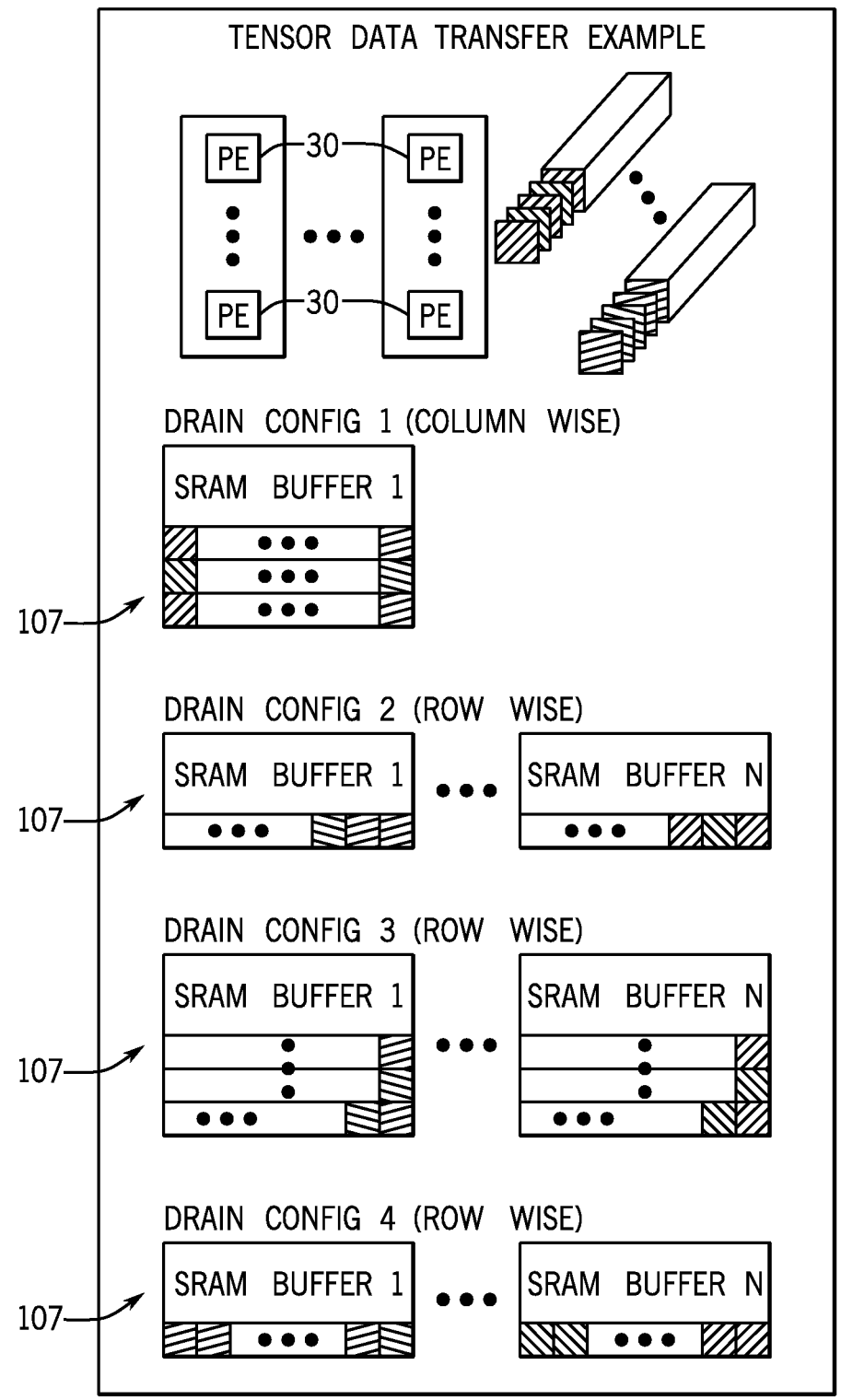
FIG. 9 is a graphical illustration of example output activation tensor data reorganization, in accordance with an embodiment.

The SRAM buffer 107 is composed of byte-enabled-write register files with multiple entries. The width of SRAM buffer (e.g., entry width) may be the same as SRAM data width in an SRAM bank 80. Each SRAM buffer 107 follows a 1:1 dedicated connection to its SRAM Bank 80. The write operation of OF data line to SRAM buffer is controlled by configuration descriptors 152 (e.g.,"ByteDuplicate", "ByteDuplIterOF", "ByteOffsetDuplIterOF", "LineDuplicateOF", or "LineDuplIterOF"). For example, when the "ByteDuplicate" is enabled, the OF data is written "ByteDuplIterOF" times to one SRAM buffer 107 entry, and each write operation follows a byte position offset of "ByteOffsetDuplIterOF". When "LineDuplicateOF" is enabled, the OF data is first written to the same byte position consecutively of number of "LineDuplIterOF" entries, then further writes follow a byte position offset of "ByteOffsetDuplIterOF" to restart from the same entry. Details of the descriptor fields are described in Table 2. Examples of OF tensor data reorganization in SRAM buffers are shown in FIG. 9 for different data patterns. Once one SRAM entry is completed in SRAM buffer 107, the data is written to its corresponding SRAM bank 80. In summary, the FSAD 50 provides sufficient flexibility to re-arrange the OF data in the SRAM buffers 107 before writing to the SRAM banks 80 and reduce the number of writes to SRAMs at the same time (forming the entire SRAM line before writing to SRAM banks).

Psum extraction and reload is used for schedules that splits outer loop on input channels. For these schedules, Psum can be extracted through a dedicated path from N PE columns 86 to N SRAM banks 80. Since the Psum uses 4 times the bit-width than OF points use, 1 Psum point is split to 4 SRAM lines. The dedicated path reduces the load/extraction delay for partial products thereby increasing performance.

In some embodiments, the tensor address generation unit 54 mainly uses counters and iterators to generate tensor addresses. Such usage of counters and iterators reduces critical paths and wirings for higher frequency. In addition, the Load FSM 56 and the Drain FSM 58 adds complexity mainly in OF data extraction path (Drain FSM 58). Due to the complexity added to the Drain FSM 58 therefore the load path for the next layer's IF can be simplified to avoid/reduce performance penalties by prioritizing loading over extracting/draining. Furthermore, the FSAD 50 does not depend on the memory hierarchy used by the accelerators 24 in terms of register files and SRAM organizations. The implementation of our proposed design can also employ different types (e.g. flip-flop, RF, and SRAM) for the local memory 32.

Example Use Cases

Figure 10:
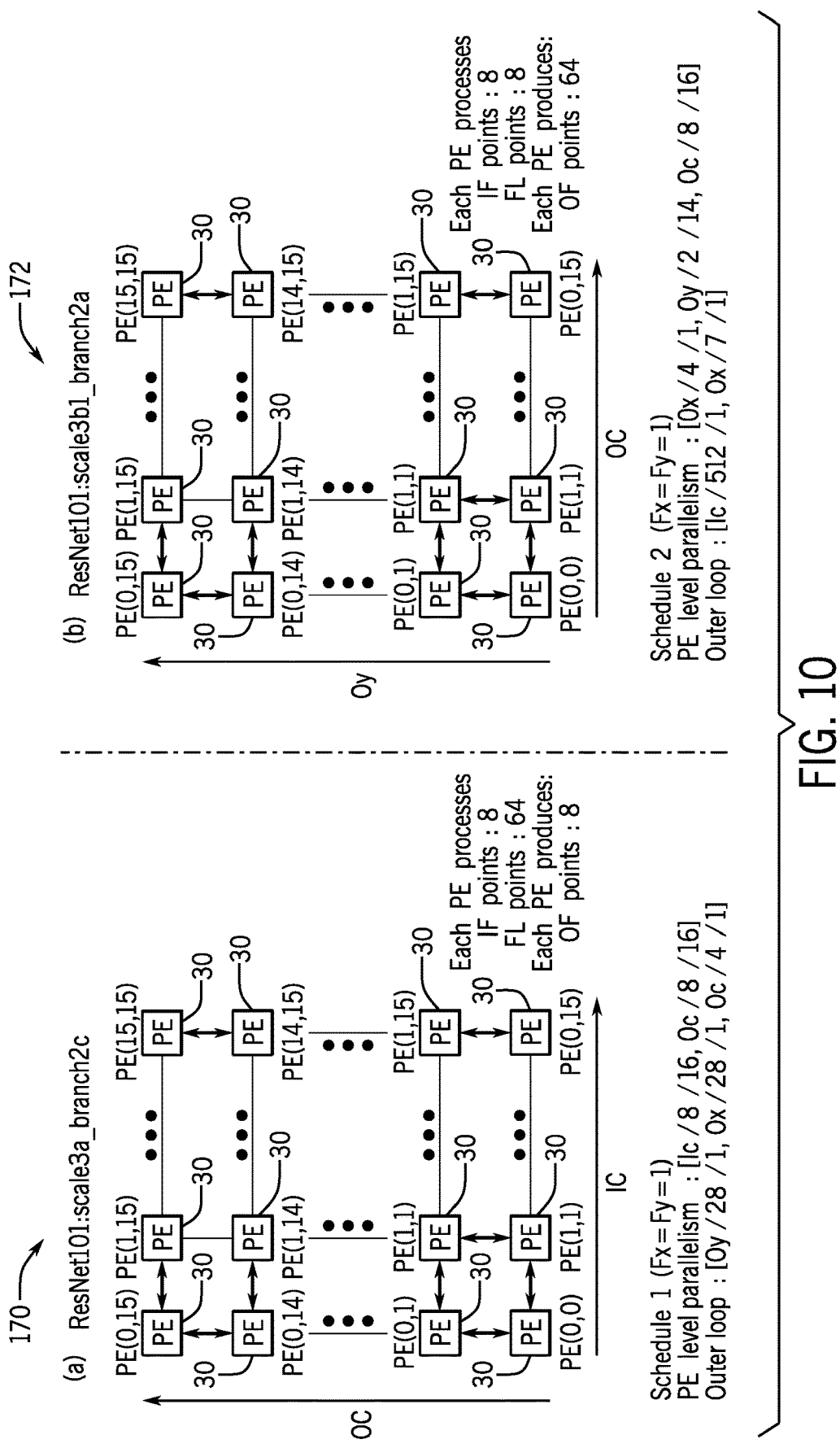
FIG. 10 is a graphical illustrations of two layers of the DNN and corresponding optimal schedules, in accordance with an embodiment.

Assuming 16×16 PE 30 arrays with 16 SRAM banks 80 and 16 SRAM buffers 107 in the following description (N=16), FIG. 10 illustrates 2 different optimal schedules for 2 consecutive layers of ResNet101 mapping to a 16×16 PE 30 array. However, the FSAD 50 may be applied to other PE 30 array dimensions and/or mapping types. For a scale3a_branch2c layer 170, its optimal schedule maps 16 partitions of 8 Oc and 16 partitions of 8 input channels (Ics) to 16 rows and 16 columns of the PE 30 array, respectively. Each PE 30 takes 8 Ic points and 8 output channel (Oc) points to generate 64 OF points. Therefore, the schedule uses 8 IF points for 8 different Ics, and 64 FL points for 8 different Ics and 8 different Ocs. 28 Ox, 28 Oy as well as the remaining 4 partitions of Oc are used in the outer loops. Since 16 partitions of the Ics map to 16 columns, the final OF uses accumulation along the PE 30 row direction (e.g. PE(i, 15) for i=0 to 15), and the OF extraction is from the last PE column 86 (e.g., PE(15, i) for i=0 to 15). Since FL is reused by the outer loop Oy and Ox, this dataflow is weight stationary.

Different from the scale3a_branch2c layer 170, an optimal schedule for a res3b1_branch2a layer 172 uses 16 partitions of 8 Oc, 14 partitions of 2 Oy, and 1 partition of 4 Ox mapping to the 16×16 PE 30 array, where Oy and Oc mapping to 16 rows and 16 columns, respectively. Therefore, the schedule uses 8 IF points for 4 different Ox and 2 different Oy, and 8 FL points for 8 different Oc. Each PE 30 will generate 64 Psums of 1 Ic. Since 512 partitions of Ic and 7 partitions of Ox are in the outer loops, 64° F. points per PE for 256 PEs 30 are generated after 512 outer loops. Since IF and FL are brought to PEs 30 every inner loop and Psum is stationary across all PEs, this dataflow is output stationary. Note that in Resnet101, although the res3b1_branch2a layer 172 and the scale3a_branch2c layer 170 has an element-wise operation layer in-between, the data pattern mismatch remains. Without alleviating the mismatch using the FSAD 50 or using static schedules, the mismatch between the data patterns used by different schedules and the way the data is laid out without knowledge of the data patterns that will arise may cause significant bank conflicts during load phase. This induces performance and energy penalties as more SRAM reads are used to complete the work and prevents the PE 30 array from reaching maximum utilization if the accesses are serialized. Software solutions can also be used for re-arranging the output activation tensor data for different optimal schedules in the consecutive convolution layers, which utilize assisting CPUs. However, the data transfer between accelerator 24 and CPU SRAMs are both latency and energy expensive, diminishing the energy efficiency gain offered by such software-driven flexible scheduling.

Figure 11:
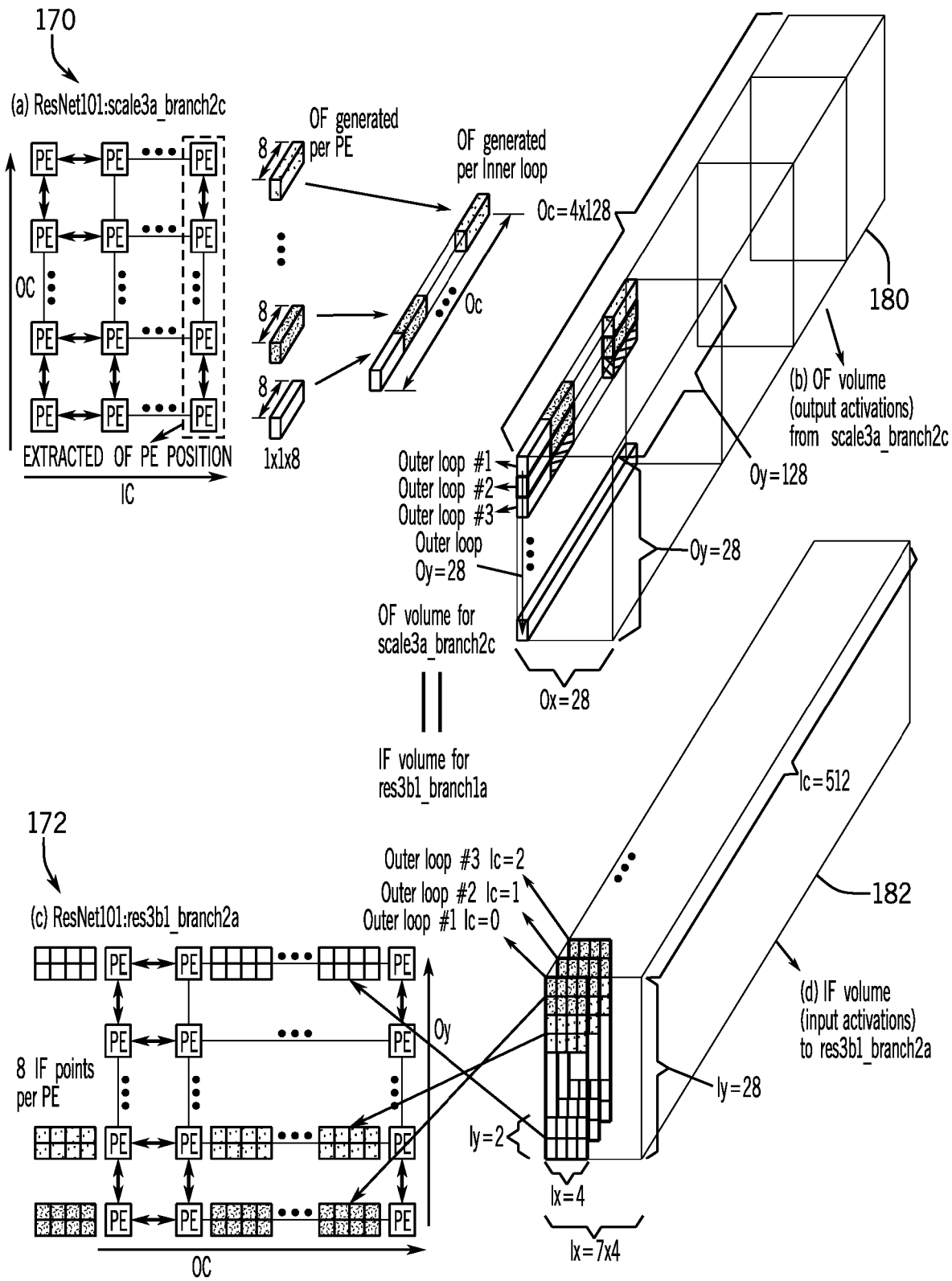
FIG. 11 is a graphical illustration of an output volume of one layer of FIG. 10 and an input volume of FIG. 10 illustrating a mismatch between the two layers, in accordance with an embodiment.

FIG. 11 further shows the scale3a_branch2c layer 170 and a corresponding generated OF volume 180. In terms of Ox×Oy×Oc, each 1×1×8 OF volume is generated per PE 30, and in total the 1×1×128 OF volume is generated from entire PE array per inner loop block. For 28 Oy outer blocks, the OF volume is filled in the order of Outer Loop #1, #2, . . . , #28 for Oy=0, 1, 2, . . . , 27 at the same Ox point (e.g. Ox=0), respectively. After filling the 1×28×128 OF volume for Ox=0, another 1×28×128 OF volume starts to fill for Ox=1, 2, . . . , 27, until the entire output tensor data is generated.

FIG. 11 also shows the IF data pattern that is used in the next layer res3b1_branch2a 172. Note the OF volume 180 generated by scale3a_branch2c 170 is the IF volume for this layer. Since 14 partitions Oy map to 14 PE 30 rows, 16 partitions of Oc map to 16 PE columns, each PE 30 uses 8 IF points, namely, 4 Ix and 2 different Iy of the same Ic. Comparing the scale3a_branch2c layer 170 and the res3b1_branch2a layer 172, a clear mismatch exists between the OF volume 180 and an IF volume 182 of the res3b1_branch2a layer 172 due to the schedule differences. Accordingly, direct feed the OF volume 180 from scale3a_branch2c layer 170 to the res3b1_branch2a layer 172 may encounter bank conflicts and stalls.

Figure 12:
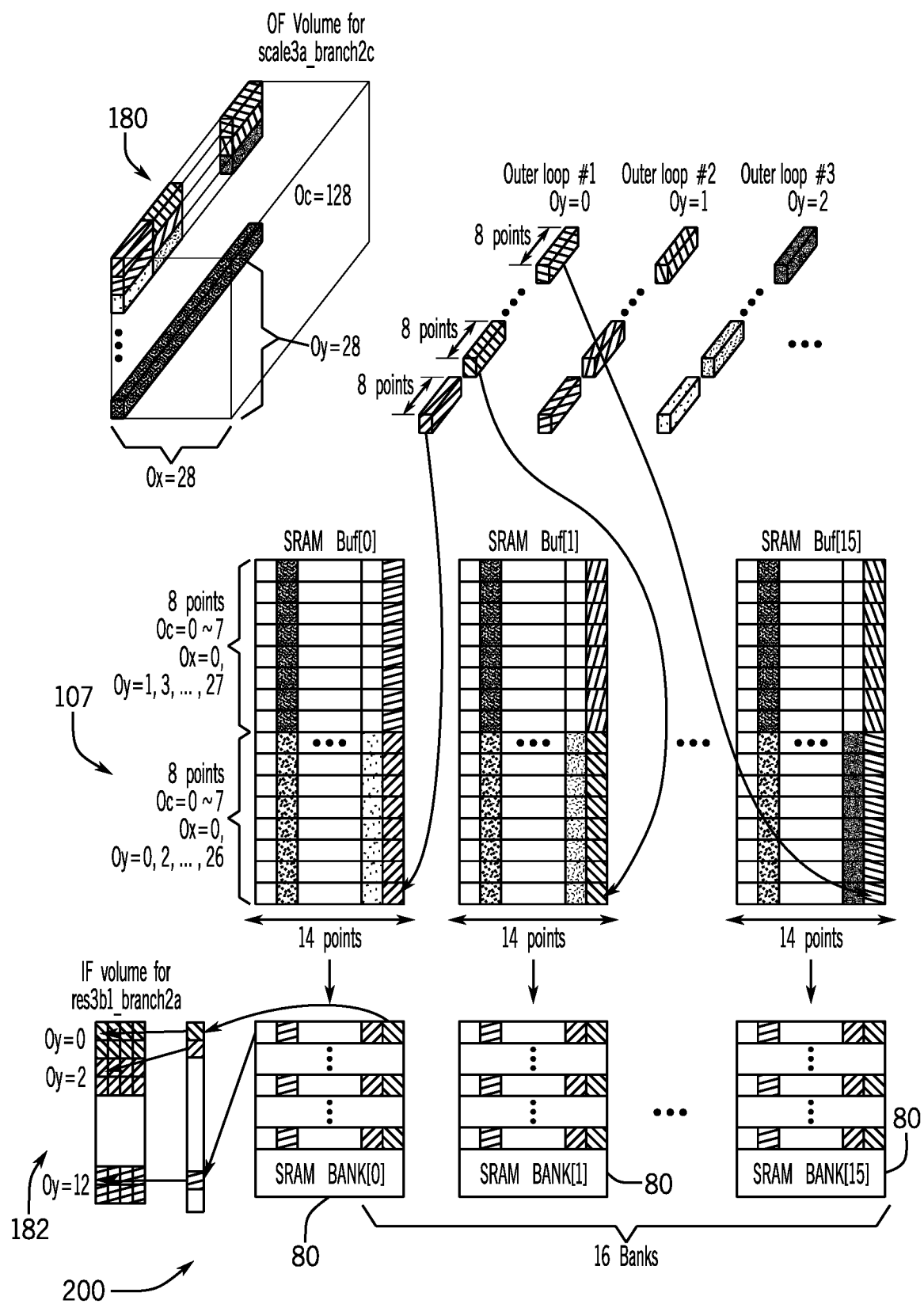
FIG. 12 is a flow diagram of addressing the mismatch between the two layers illustrated in FIG. 11, in accordance with an embodiment.

To connect the different schedules between 2 layers, the FSAD 50 can (1) distribute input tensor data IF and FL for the scale3a_branch2c layer 170, (2) extract the OF data from PE 30 array of the scale3a_branch2c layer 170 and re-arrange the tensor data in the SRAM buffers 107 according to the schedule of the res3b1_branch2a layer 172. Tables 2 and 3 below shows the configuration descriptor settings in the FSAD 50, and FIG. 12 illustrates the corresponding OF dataflow 200 to SRAM buffers 107 before writing to SRAM banks 80.

TABLE 2

Load FSM Configuration Descriptors

| Load FSM Related Configuration Descriptors | Values |
| --- | --- |
| IFActvSRAM | "FFFF" |
| FKActvSRAM | "FFFF" |
| LinesInnerBlkIFSRAM | 1 |
| LinesTotalIFSRAM | 784 |
| StrideIFSRAM | 1 |

TABLE 2-continued

Load FSM Configuration Descriptors

| Load FSM Related Configuration Descriptors | Values |
| --- | --- |
| LinesInnerBlkFLSRAM | 64 |
| LinesTotalFLSRAM | 256 |
| StrideFLSRAM | 1 |
| DuplicateIF | True |
| DuplicateFL | False |
| DuplIterIF | 8 |
| DuplIterFL | 0 |
| SRAMLineMuxIF[i] | i |
| SRAMByteMuxIF[i] | 0 |
| SRAMLineMuxFL[i] | i |
| SRAMByteMuxFL[i] | i |

TABLE 3

Drain FSM Configuration Descriptors

| Drain FSM Related Configuration Descriptors | Values |
| --- | --- |
| SRAMBankMuxOF[i] | i |
| SRAMByteMuxOF[i] | 15 |
| SRAMBufByteMask | "0001" |
| OFColRowSel | True |
| ByteDuplicateOF | True |
| ByteDuplIterOF | 14 |
| ByteOffsetDupliterOF | 1 |
| LineDuplicateOF | True |
| LineDuplIterOF | 16 |

Input Activation IF and Weights FL Tensor Data Distribution for Current Layer

As previously noted in FIG. 11, Ic for the scale3a_branch2c layer 170 is split across 16 columns. With IFActvSRAM and FLActvSRAM set to "FFFF", the 16 IF banks and 16 FL banks are set to active to access in parallel for different Ic data in 16 PE columns 86. IF in one IF SRAM Bank[i] 107 and FL points in one FL SRAM Bank[i] 107 are mapped to one PE Col[i] 86 (i=0, 1, . . . , 15), respectively. "SRAMByteMuxIF[i]" set to "0" for IF with "DuplIterIF" set to "8" results in duplicating 8 IF points across 16 PE 30 rows. In contrast, "SRAMByteMuxFL[i]" set to "i" for FL leads to distributing 16 FL points of 1 SRAM line to 16 PE 30 rows. In total, 256 different FL points are loaded to 256 PEs 30 for 1 load, respectively. With "LinesInner-BlkFLSRAM" set to "64", 64 FL points per PE 30 are distributed for an inner loop. Similar load patterns are repeated for all outer loops.

Output Activation OF Tensor Data Extraction of the Current Layer

With "OFColRowSel" set to true, OF points in the scale3a_branch2c layer 170 are extracted using a row-wise scheme. Since 8 OF points of different Oc are generated in every PE of Col[15] 86, row-wise extraction extracts 16 rows of OF points, in which only the 15th point position (the last column position) has valid OF points. Since "SRAM-BankMuxOF[i]" is set equal to the row index i, OF data from Row[i] will be directed to SRAM Buffer[i] 107. With "SRAMByteMuxOF[i] set to 15, each SRAM Buffer 107 line will select OF point position 15 in the extracted OF row data, which matches the valid OF data point's position. Also, since "LineDuplicateOF" is set to true and "LineDu-plIterOF" is set to 16, at the 1 drain operation, the 8 OF points extracted from a single PE 30 are written to the point position "0" in 8 entries of the SRAM buffer 107, respectively. After filling 16 entries, new OF points can start to write to entry 0 with "Byteoffset" of 1 to byte position "1".

Given that "ByteDuplIterOF" is set to 14 and "ByteDuplicate" is true, after filling the 14th point position, the SRAM buffer 107 will write one completed SRAM line to its corresponding SRAM bank 80.

Input Activation IF Tensor Data Distribution for the Next Layer:

With these drain settings, one SRAM line contains 14 OF points corresponding to different Oy points of the same Ox and Oc. In particular, the first 8 entries of the SRAM bank contain Oy points of 0, 2, 4, . . . , 26, and the next 8 entries of the SRAM buffer contains Oy points of 1, 3, 5, . . . , 27. Note that SRAM Bank [0] 80 contains Oc points from 0 to 7, SRAM Bank [1] 80 contains Oc points from 8 to 15, SRAM Bank [3] 80 contains Oc points from 16 to 23 and so on. Therefore, when load IF volume 182 is loaded for the res3b1_branch2a layer 172, 1 SRAM line contains all 16 points for 16 rows of the PE 30.

With the OF data re-organized by the FSAD 50, when loading IF data for the res3b1_branch2a layer 172, one SRAM line can provide the IF points to the same PE column 86 in one load. With the capability of multicasting for load path (e.g. 1 SRAM bank data feeds all 16 PE columns), there are no bank conflicts for the load phase when implementing the res3b1_branch2a layer 172's optimal schedule. Note that the use case example provided in this session has two highly mismatched schedules. For schedules with mapping and blocking similarities, the implementation of the tensor data distribution module may also be completed using the FSAD 50.

Figure 13:
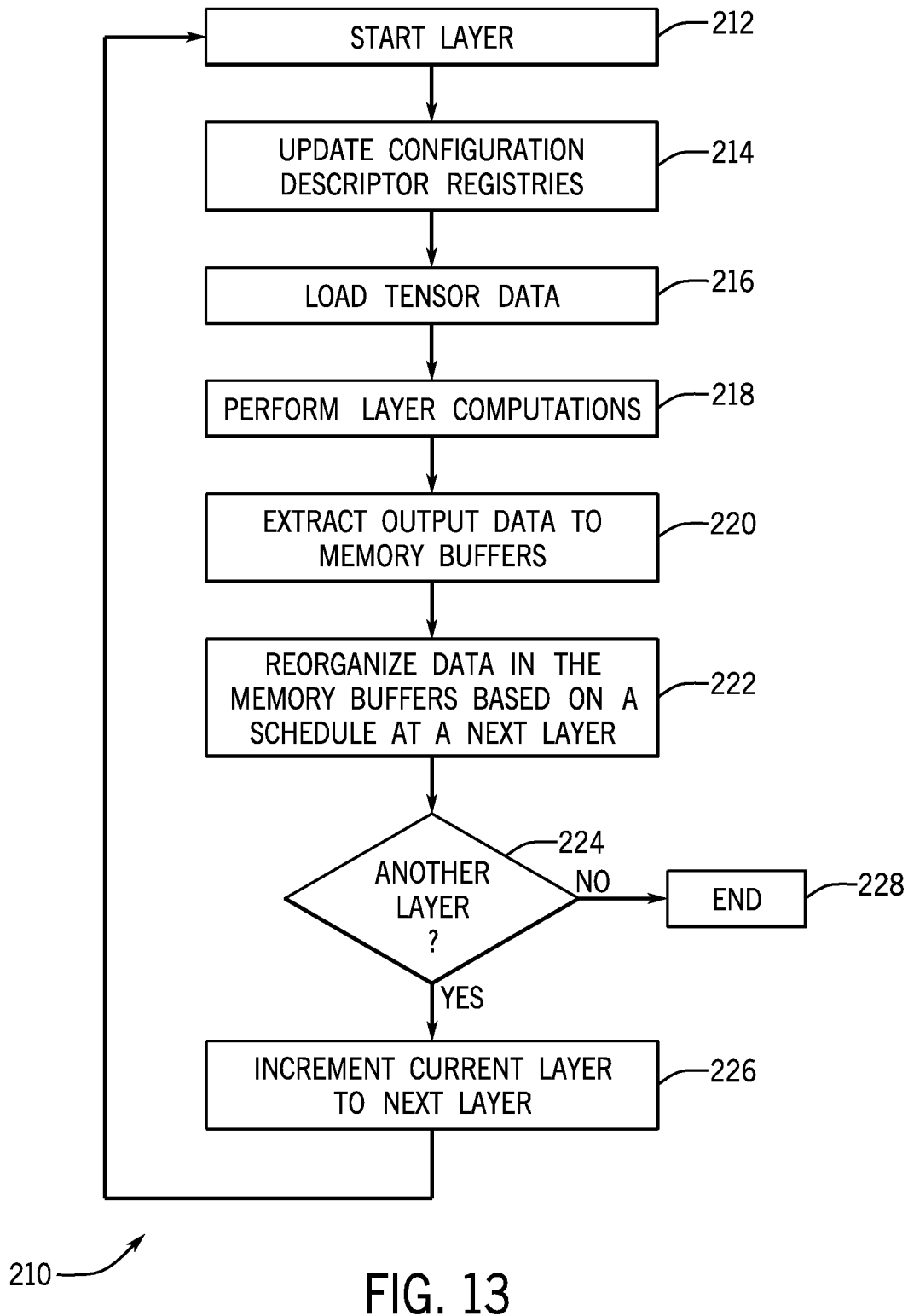
FIG. 13 is a flowchart of a method for performing schedule-aware tensor data movement, in accordance with an embodiment.

FIG. 13 illustrates a flow diagram of a process 210. As illustrated, at the start of a new layer (block 212), the FSAD 50 updates the configuration descriptor registers 52 used to describe a schedule for a current layer of multiple layers (block 214). Based at least in part on the values of the configuration descriptor registers 52, the Load FSM 56 loads tensor data into the PEs 30 (block 216). Using the loaded tensor data, the PEs perform computations for the deep neural network inference (block 218). After the computations are completed, the Drain FSM 58 extracting output data to the SRAM buffers 107 (block 220). The Drain FSM 58 reorganizes the output data using the SRAM buffers 107 to the memory banks (e.g., SRAM banks 80) based on a schedule for a next layer of the multiple layers (block 222). The DNN system 10 then determines whether additional layers are to be used (block 224). If the additional layers are to be used, In summary, the FSAD 50 provides a low-cost programmable hardware solution which enables supporting of flexible schedules and several dataflow mappings in the accelerators 24. The FSAD 50 does not depend on the RF and SRAM organizations and choices of the accelerators 24 hence may be applied to a wide range of ML accelerators. The FSAD 50 also enables Accelerators 24 to exploit enhanced energy efficiency from data reuse. Additionally, the FSAD enables a low area and power consumption to achieve the reduced power costs. For instance, the FSAD 50 may consume less than 2.2% of area and less than 2.7% of total power of the accelerator 24 while the FSAD 50 enables an increased energy efficiency of 41% (e.g., using Eyeriss). In other words, the FSAD 50 enables lower overall energy consumption with a small area increase.

While the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims.

What is claimed is:

1. A neural network accelerator, comprising:
   a memory;
   a plurality of processing engines coupled together and configured to perform arithmetic operations in support of an inference performed using the neural network accelerator, wherein the plurality of processing engines are implemented using a plurality of processing elements; and
   a schedule-aware tensor data distribution circuitry configured to:
      load tensor data into the plurality of processing engines in a load phase;
      extract output data from the plurality of processing engines in an extraction phase, wherein extracting the output data from the plurality of processing engines may be performed in a row-wise or column-wise organization;
      reorganize the extracted output data based at least in part on a schedule for a next layer after a current layer to output the extracted output data by reshaping the extracted output data for storage in the memory to reduce a number of accesses to the memory for the next layer by changing a shape of how the extracted output data is stored in the memory based at least in part on a type of the next layer, wherein changing the shape comprises reorganizing the extracted output data to a column-wise organization from the row-wise organization or to the row-wise organization from the column-wise organization based on a specification of the next layer; and
      store the reorganized extracted output data to the memory.

2. The neural network accelerator of claim 1, wherein the memory comprises a static random-access memory (SRAM).

3. The neural network accelerator of claim 1, wherein the schedule-aware tensor data distribution circuitry comprises buffers, and the schedule-aware tensor data distribution circuitry is configured to use the buffers in the reorganization of the extracted output data before storing the reorganized extracted output data in the memory.

4. The neural network accelerator of claim 1, wherein the schedule-aware tensor data distribution circuitry comprises a drain finite state machine that performs the reorganization of the extracted output data.

5. The neural network accelerator of claim 1, wherein the schedule-aware tensor data distribution circuitry comprises a load finite state machine that performs loading of the tensor data into the plurality of processing engines.

6. The neural network accelerator of claim 1, wherein the tensor data comprises input activations or feature maps used to control how input data is input to the plurality of processing engines.

7. The neural network accelerator of claim 1, wherein the tensor data comprises weights or filter values that are used to weight computations of the plurality of processing engines.

8. The neural network accelerator of claim 1, wherein the plurality of processing elements comprises respective plurality of multiply accumulate circuitries.

9. A deep neural network system, comprising:
one or more neural network accelerators comprising:
  a plurality of processing engines coupled together and configured to perform arithmetic operations in support of an inference performed using the deep neural network system, wherein the plurality of processing engines are implemented using a plurality of processing elements;
  a schedule-aware tensor data distribution circuitry, comprising:
    a load finite state machine configured to load tensor data into the plurality of processing engines in a load phase;
    a drain finite state machine that is configured to:
      extract output data from the plurality of processing engines in an extraction phase;
      adjust the extracted output data based at least in part on a schedule for a next layer after a current layer to output the extracted output data by reshaping the extracted output data for storage in memory to reduce a number of accesses to the memory for the next layer by changing a shape of how the extracted output data is stored in the memory based at least in part on a type of the next layer; and
      store the adjusted extracted output data to a plurality of memory banks.

10. The deep neural network system of claim 9, wherein the drain finite state machine comprises a plurality of memory buffers.

11. The deep neural network system of claim 10, wherein the plurality of processing engines are arranged in an array of rows and columns, and a number of memory buffers of the plurality of memory buffers equals a number of columns of processing engines of the plurality of processing engines.

12. The deep neural network system of claim 11, wherein a number of memory banks of the plurality of memory banks is equal to the number of memory buffers of the plurality of memory buffers, wherein each memory buffer is dedicated to a corresponding memory bank of the plurality of memory banks.

13. The deep neural network system of claim 9, wherein the adjustment of the extracted output data addresses a difference in extraction and loading schemes between layers of the inference to reduce energy consumption by the one or more neural network accelerators due to the reduced number of memory accesses.

14. The deep neural network system of claim 13, wherein reducing energy consumption comprises reducing a number of writes to the plurality of memory banks due to the difference in extraction and loading schemes between the layers of the inference.

15. The deep neural network system of claim 14, wherein the plurality of memory banks comprises a plurality of static random-access memory banks.

16. A method, comprising:
for a plurality of layers of a deep neural network inference:
  updating configuration descriptor registers used to describe a schedule for a current layer of the plurality of layers;
  based at least in part on the configuration descriptor registers, loading tensor data into a plurality of processing engines;
  using the loaded tensor data, performing computations using the plurality of processing engines for the deep neural network inference;
  after the computations are performed, extracting output data; and
  reorganizing the extracted output data to memory banks based on a schedule for a next layer of the plurality of layers by reshaping the extracted output data for storage in the memory banks to reduce a number of accesses to the memory banks for the next layer by changing a shape of how the extracted output data is stored in the memory banks based at least in part on a type of the next layer.

17. The method of claim 16, wherein for the plurality of layers of the deep neural network inference, loading the reorganized output data to the plurality of processing engines in a loading phase for the next layer.

18. A neural network accelerator, comprising:
a memory;
a plurality of processing engines coupled together and configured to perform arithmetic operations in support of an inference performed using the neural network accelerator, wherein the plurality of processing engines are implemented using a plurality of processing elements; and
a distribution circuitry configured to:
load tensor data into the plurality of processing engines in a load phase;
extract output data from the plurality of processing engines in an extraction phase,
  wherein extracting the output data from the plurality of processing engines may be performed in a row-wise or column-wise organization;
reorganize the extracted output data based at least in part on a schedule for a next layer after a current layer to output the extracted output data by reshaping the extracted output data for storage in the memory to reduce a number of accesses to the memory for the next layer by changing a shape of how the extracted output data is stored in the memory based at least in part on a type of the next layer, wherein changing the shape comprises reorganizing the extracted output data to a column-wise organization from the row-wise organization or to the row-wise organization from the column-wise organization based on a specification of a next layer; and
store the reorganized extracted output data to the memory.

* * * * *